Figure 1:
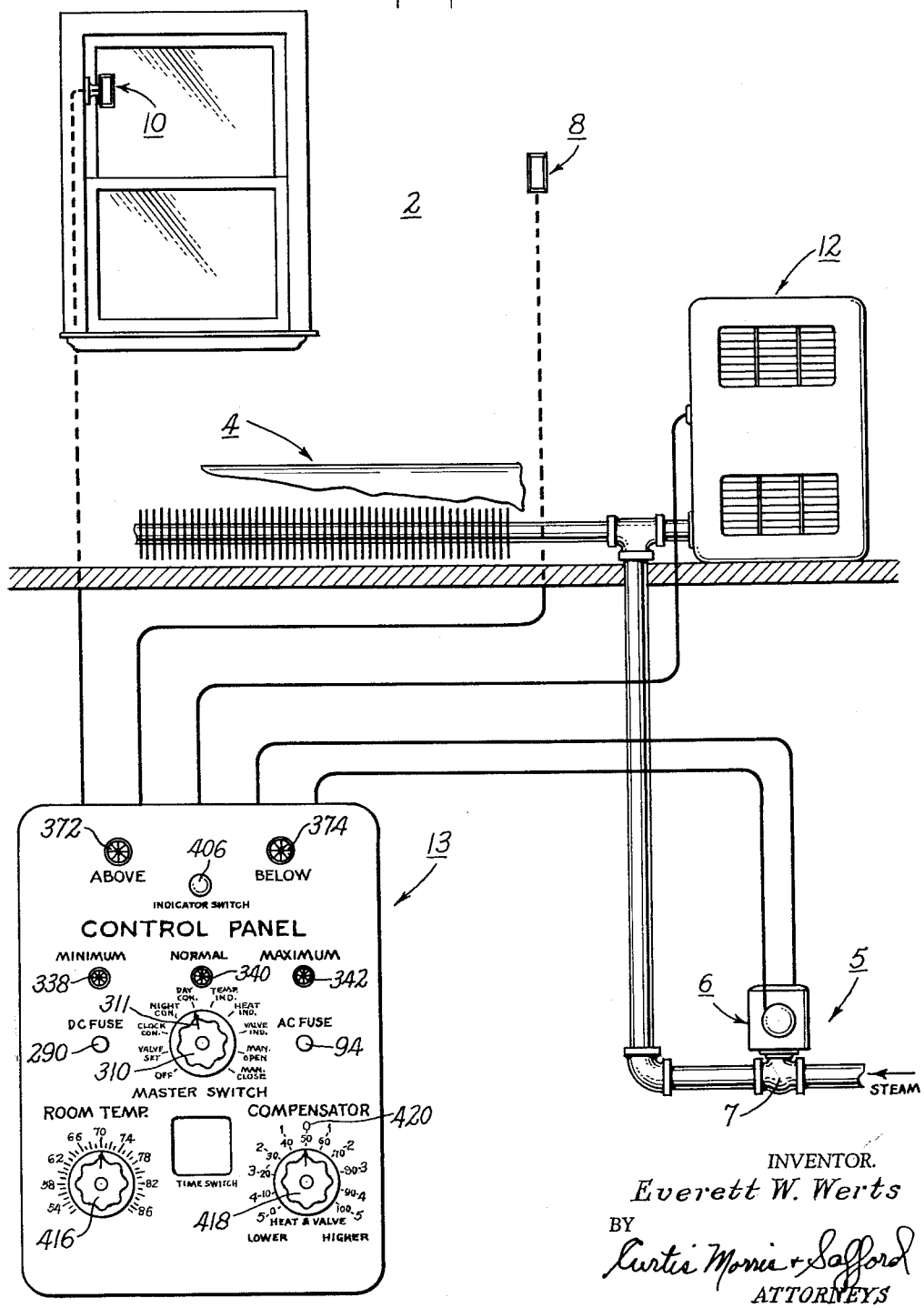

INVENTOR.
Everett W. Werts

Sept. 18, 1962     E. W. WERTS     3,054,562
BALANCED BRIDGE-TYPE TEMPERATURE CONTROL SYSTEM
Filed Dec. 16, 1957     5 Sheets-Sheet 3

INVENTOR.
*Everett W. Werts*
BY
*Curtis Morris + Safford*
ATTORNEYS

Sept. 18, 1962 E. W. WERTS 3,054,562
BALANCED BRIDGE-TYPE TEMPERATURE CONTROL SYSTEM
Filed Dec. 16, 1957 5 Sheets-Sheet 4

INVENTOR.
Everett W. Werts
BY
Curtis, Morris & Safford
ATTORNEYS

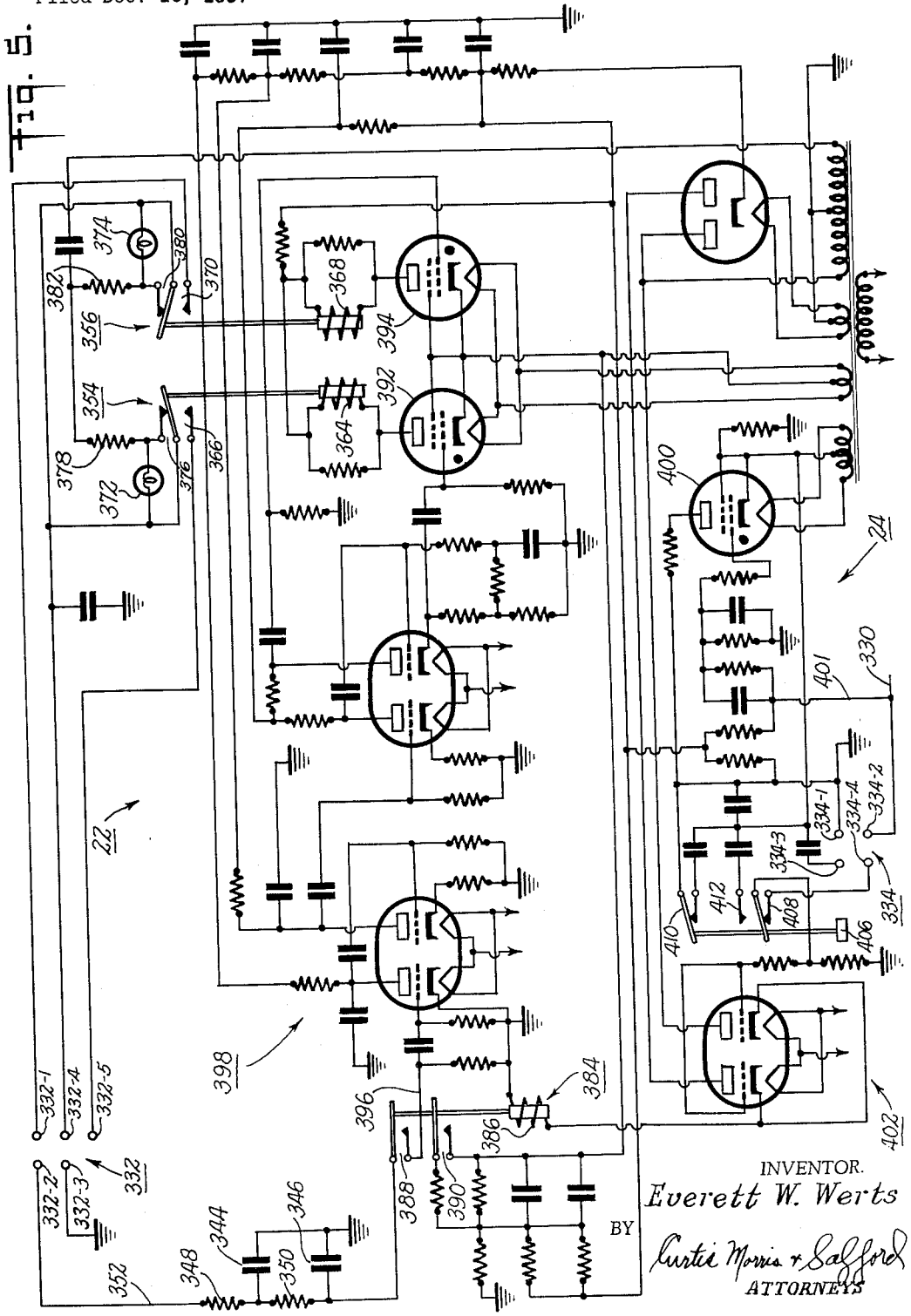

United States Patent Office 3,054,562
Patented Sept. 18, 1962

3,054,562
BALANCED BRIDGE-TYPE TEMPERATURE
CONTROL SYSTEM
Everett W. Werts, Normal, Ill., assignor to Dunham-Bush, Inc., West Hartford, Conn., a corporation of Connecticut
Filed Dec. 16, 1957, Ser. No. 703,049
20 Claims. (Cl. 236—91)

This invention relates to temperature control, and more in particular to improved resistance-type temperature controlling and indicating systems of the type which control the supplying of heat to a zone and which also provide indications of the operation, the existing temperature conditions within the zone, and other functional characteristics of the system. Certain aspects of this invention constitute improvements upon the invention disclosed in Patent No. 2,362,977.

It is an object of the present invention to provide an improved control system of the type referred to above and to provide improved arrangements of the components and parts thereof. It is a further object to provide an improved method and system for controlling the temperature of a space or zone which may be a part of or an entire building, or group of buildings. It is a further object to provide for the above with equipment and components which are superior to those previously available. It is a further object to provide improved systems of the above nature, wherein the costs of installation and service are minimum, and the standards of operation and performance are maximum. These and other objects will be in part obvious, and in part pointed out below.

The illustrative embodiment of the present invention is particularly suited to provide accurate and dependable temperature control for a space, such as, a school or other building or a portion thereof, or a group of buildings. An electrical system is provided which includes a number of interconnected bridge circuits with temperature-responsive resistance elements which sense: the temperature in the space; the heating load, as represented by the temperature outside of the space; and, the rate to which heat is being added to the space, as represented by the change in the temperature of air passing over or through a calibrated or representative air heating coil. Timing mechanisms carry on a constant temperature sensing and indicating cycle, and the supply of heat is modulated to change the heat supply rate, in response to changes in the outside temperature and changes in the temperature within the space.

The entire electrical network formed by the resistance bridges and the other components of the temperature sensing and heat control system is energized constantly by direct-current, so that no "warm-up" delay is involved in sensing or reading the indication of each bridge circuit at any time. Furthermore, the bridges are permanently interconnected, as distinguished from the arrangement in the patent referred to above, wherein switches are closed to connect each bridge into the sensing and indicating circuit only during the time when its condition of balance or unbalance is being sensed or indicated. The permanent interconnection of the bridges is provided by a resistance network which is so arranged as to prevent a condition of balance or unbalance in one bridge from producing any material effect upon a true sensing or indication as to another bridge. In other words, while the bridges are all permanently interconnected, each acts independently in producing accurate signals and indications as to its conditions of balance or unbalance.

The illustrative embodiment of the present invention includes a master control switch which is turned manually to various positions to provide modes of operation and the functioning for the system of the general nature of the system disclosed in the patent referred to above. The system includes a clock or time switch which may be set to change the system during each twenty-four-hour period between "day" and "night" operation. There is also a cyclical timer which operates continuously to connect the control bridge circuits sequentially to the heat control unit, thus to effect the controlling functions. The heat control unit includes an electronic timer and heat controller which performs the heat controlling operations in a step-by-step fashion.

Figure 2:
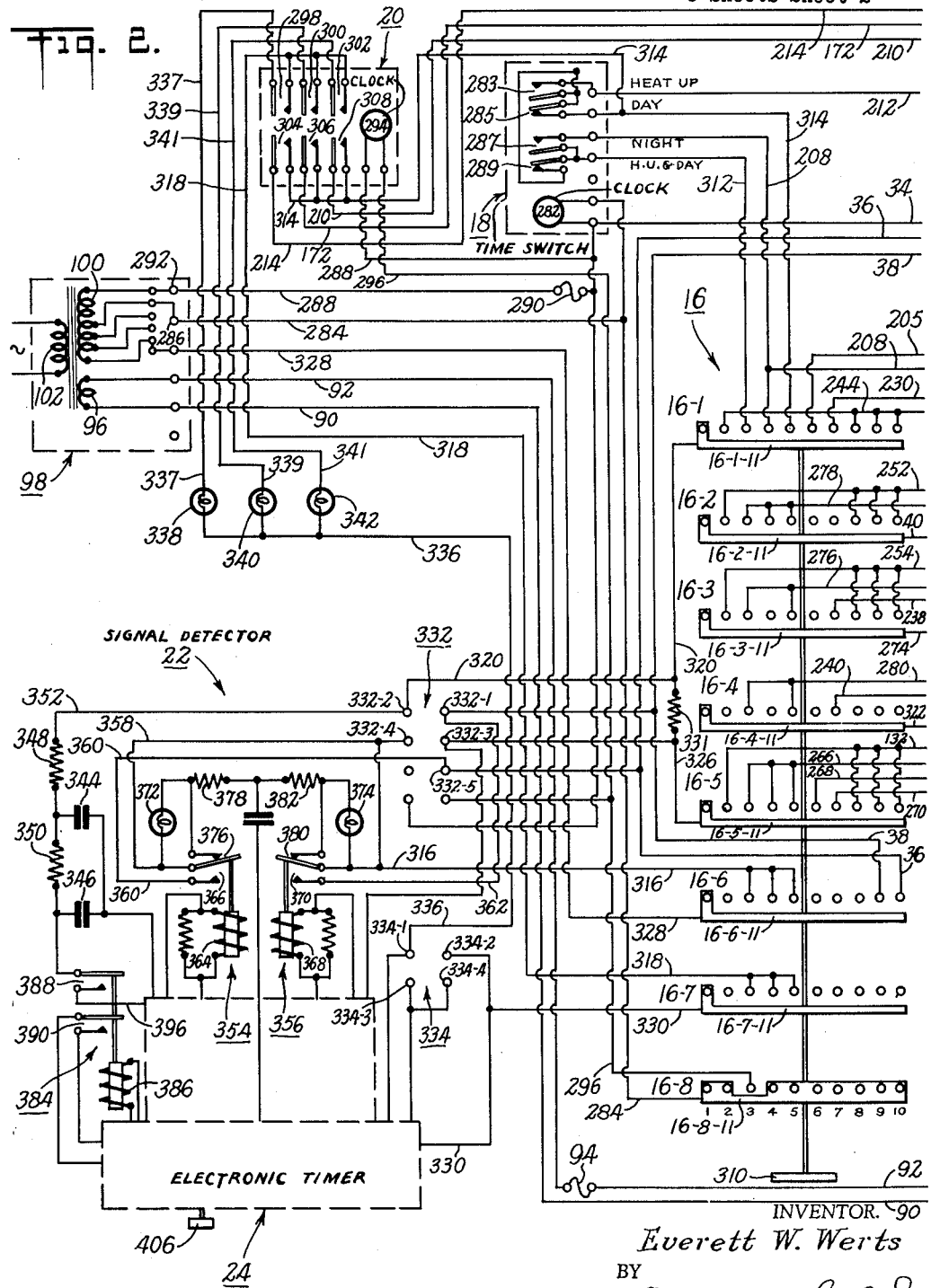
Figure 3:
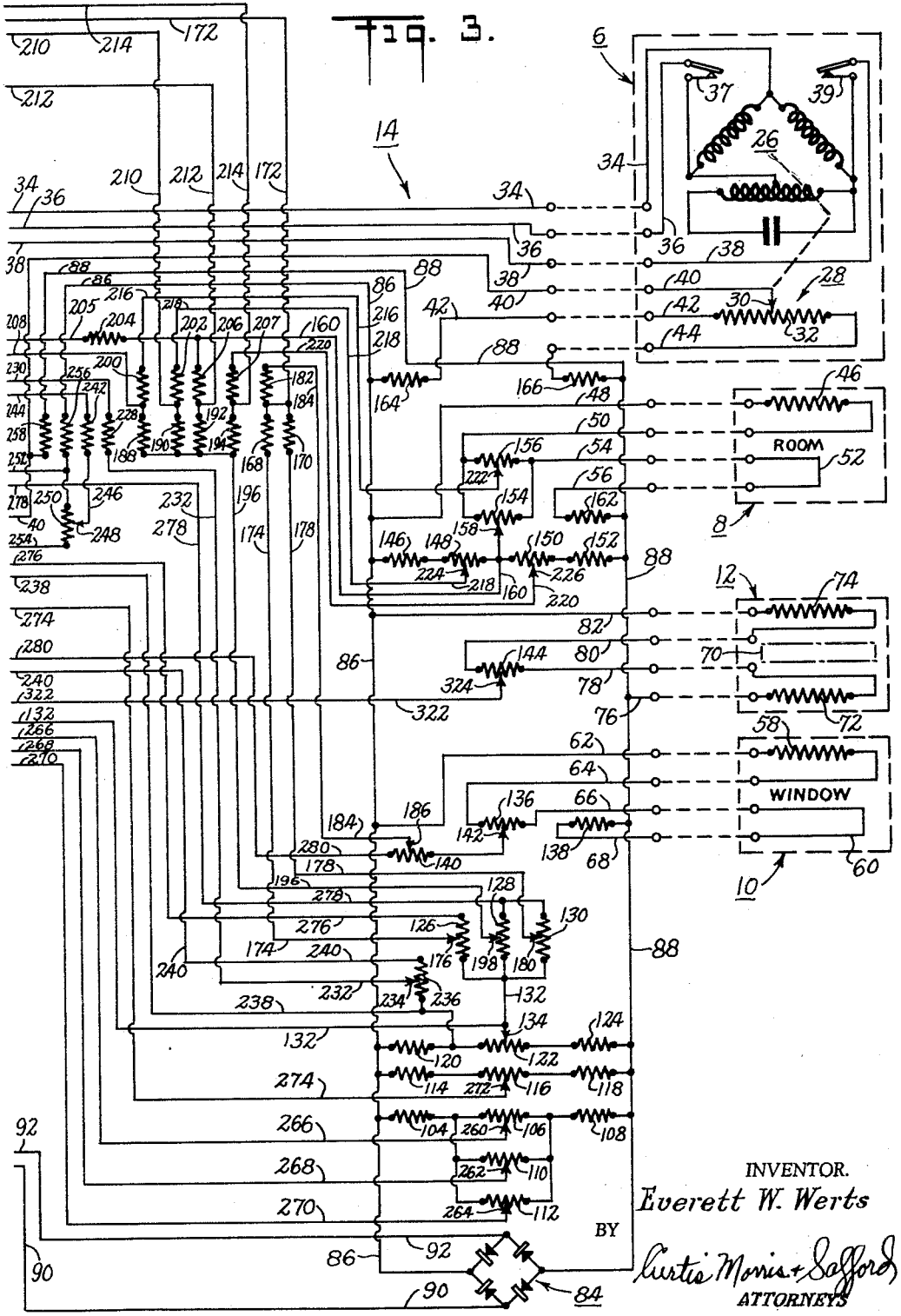
Figure 4:
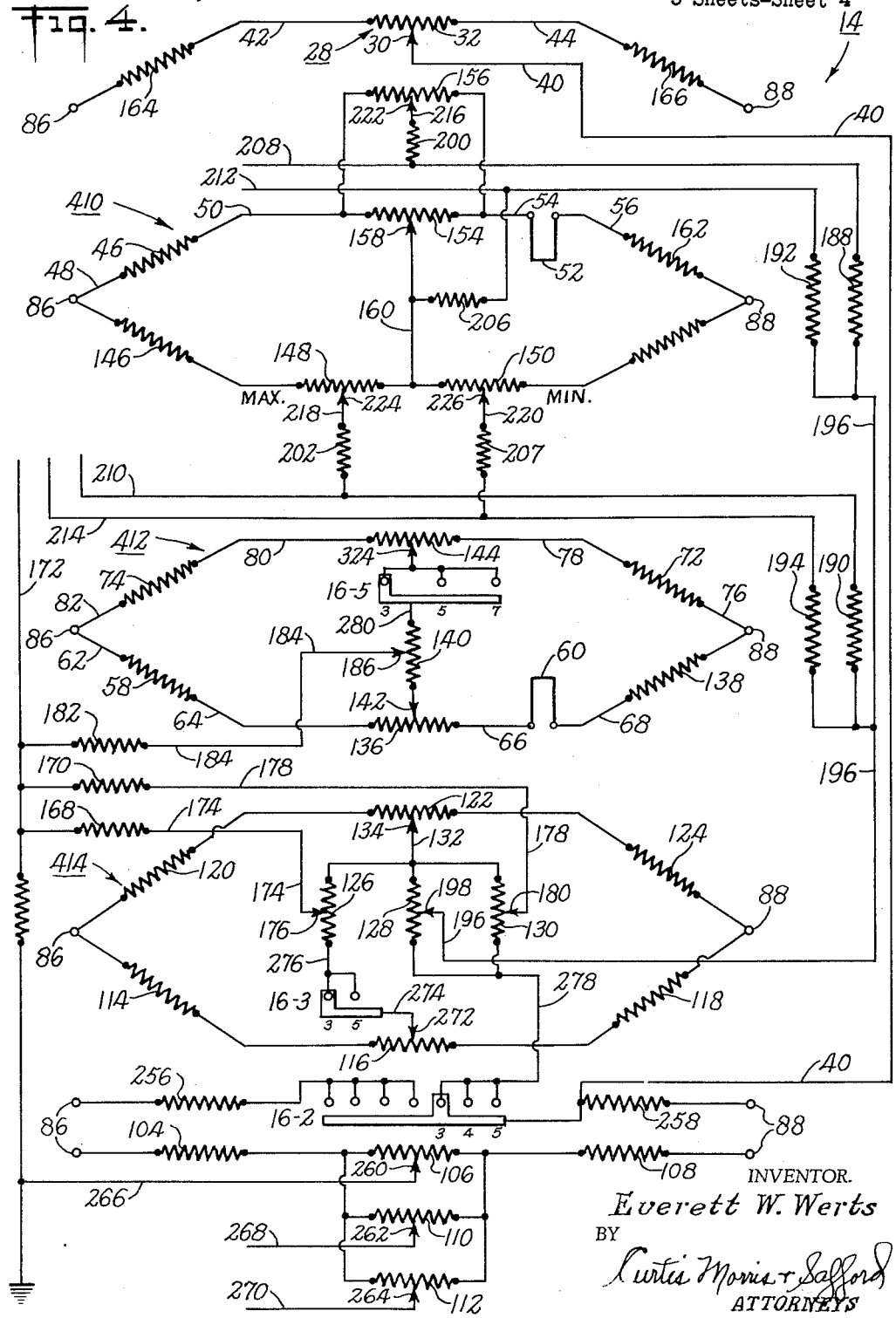

In the drawings:

FIGURE 1 is a schematic representation of a heating system which constitutes one embodiment of the invention;

FIGURES 2 and 3 constitute a schematic circuit diagram of the system of FIGURE 1;

FIGURE 4 is a simplified circuit diagram of the control bridges and resistance network of FIGURES 2 and 3; and, FIGURE 5 is a circuit diagram of the detector and amplifier circuit shown at the lower left-hand portion of FIGURE 2.

Referring to FIGURE 1 of the drawings, a space 2 is heated by a convector 4, to which steam is supplied through a valve assembly 5 formed by a valve 7 and a valve positioning unit 6. Within the space 2 there is a room thermostat 8, a window thermostat 10 and a special convector unit or "heat balancer" 12. The system also includes a control panel 13 which is hinged to a control box (not shown), and within which the remainder of the control system is mounted. The components 6, 8, 10 and 12 of FIGURE 1 are represented at the right of FIGURE 3 by broken line rectangles, each enclosing its electric components. The electric circuit formed by FIGURES 2 and 3 also includes a resistance network 14, a manually operable rotary gang switch 16, a clock or time switch 18, an electric sequence timer 20, and a signal detector or amplifier 22 which includes an electronic timer 24.

The valve positioning unit 6 includes a valve motor 26 which is adapted to operate in one direction to move the valve toward its fully closed position, and in the opposite direction to move the valve toward its fully open position. Mounted with motor 26 is a potentiometer 28 which has its movable contact 30 mechanically connected to the valve operating unit, so that this contact is moved along the resistance 32 simultaneously with the movement of the valve between its fully-closed and fully-opened position. Hence, the setting of the potentiometer always corresponds to the relative position of the valve. The valve operating motor 26 has a central lead 34, a lead 36 at the left which is energized to effect closing movement of the valve, and a lead 38 at the right which is energized to effect opening movement of the valve. Limit switches 37 and 39 are in series with leads 36 and 38, respectively, and each is opened by the movement of the valve to its extreme position.

Leads 34, 36 and 38 are connected in a manner explained below to the detector and amplifier unit 22, whereby valve-opening and closing-signals are transmitted to the valve operating motor. Potentiometer 28 is connected by three leads 40, 42 and 44 into the resistance network 14 referred to above, so that changes in the setting of the potentiometer cause changes in the balance conditions for the network. The room thermostat 8 has a temperature responsive resistance element 46 which is subject to the temperature of the air in space 2, and which is connected by leads 48 and 50 into the resistance network 14. The room thermostat also includes a shunt wire 52 which is connected into the bridges of resistance 46 in the resistance network by leads 54 and 56; this arrangement balances the effects of leads 48 and 50. The window thermostat 10 has a similar temperature responsive resistance element 58, and a shunt 60, similarly connected into the resistance network by leads 62, 64, 66 and 68.

The heat convector unit 12 has an air heating steam coil represented in broken lines at 70, and a pair of temperature responsive resistance elements 72 and 74 similarly connected into the network 14 by leads 76, 78, 80 and 82. Element 72 is positioned in the path of the air flowing to coil 70, and element 74 is positioned in the path flowing from this coil. Hence, the difference in the air temperatures or the resistance of these elements constitutes an accurate indication of the amount of heat which is being added to the air passing through unit 12. As will be more fully explained below, the adjustments of the system are such that the difference between the resistances of these elements is at all times an accurate indication of the total amount of heat being supplied to the space 2.

The resistance network 14 receives direct current from a rectifier 84 through a positive lead 86 and a negative lead 88. Rectifier 84 receives alternating current through a pair of leads 90 and 92 (see also FIGURE 2) having a fuse 94 therein and extending from a secondary winding 96 of a transformer 98. Transformer 98 has another secondary winding 100 which supplies alternating current at different voltages to various components of the system. The primary winding 102 of the transformer is connected to a source of 110 volt, 60 cycle current.

Referring again to FIGURE 3, the resistance network 14 includes the following resistance elements: resistances 104, 106 and 108 connected in series across leads 86 and 88, resistances 104 and 108 being equal; resistances 110 and 112 connected in parallel with, and equal in value to resistance 106; resistances 114, 116 and 118 connected in series between leads 86 and 88, resistances 114 and 118 being equal; resistances 120, 122 and 124 connected in series across leads 86 and 88, resistances 120 and 124 being equal; three equal resistances 126, 128 atnd 130 connected at one end through a common lead 132 to a movable contact 134 which is along resistance 122; a resistance 136 connected between leads 64 and 66, and a resistance 138 connected between the lead 68 and the negative lead 88; a resistance 140 connected at one end to a movable contact 142 on resistance 136; a resistance 144 connected between leads 78 and 80; resistances 146, 148, 150 and 152 connected in series across the leads 86 and 88, resistances 146 and 152 being equal, and resistances 148 and 150 being equal; resistances 154 and 156 connected in parallel between leads 50 and 54 which extend from the room thermostat, resistance 154 having a movable contact 158 which is connected to the juncture of resistances 148 and 150, and to a lead 160; a resistance 162 connected between lead 56 and the negative lead 88; a pair of equal resistances 164 and 166 connected respectively at one side to the positive lead 86 and to the negative lead 88 and connected respectively at the other side to leads 42 and 44 which extend from the potentiometer 28; a pair of resistances 168 and 170 connected at one side to a common lead 172, with resistance 168 having its other side connected through a lead 174 to a movable contact 176 on resistance 126, and with the other side of resistance 170 connected through a lead 178 to a movable contact 180 on resistance 130; a resistance 182 connected at one side to lead 172 and to the other side through a lead 184 to an adjustable contact 186 on resistance 140; resistances 188, 190, 192 and 194 are connected at one side through a common lead 196 to a movable contact 198 on resistance 128; the other sides of resistances 188, 190, 192 and 194 are connected respectively to resistances 200, 202, 206 and 207, and also respectively to leads 208, 210, 212 and 214; the other sides of resistances 200, 202 and 207 are respectively connected through leads 216, 218 and 220 to movable contacts 222, 224 and 226, respectively on resistances 156, 148 and 150; the other side of resistance 206 is connected to lead 160, and thence to the juncture of resistances 148 and 150; a resistance 204 is also connected to lead 160, and its other side to a lead 205; a resistance 228 is connected at one side to a lead 230, and at the other side through a lead 232 to a movable contact 234 on a resistance 236 which is connected at one side through a lead 238 to the juncture of resistances 120 and 122; the other side of resistance 236 is connected to a lead 240; a resistance 242 is connected at one side to a lead 244, and at the other side through a lead 246 to a movable contact 248 on a resistance 250 which is connected between a pair of leads 252 and 254; a resistance 256 connected between lead 252 and the positive lead 86; and, a resistance 258 connected between the negative lead 88 and lead 40 extending from movable contact of the potentiometer 28. Engaging resistances 106, 110 and 112, respectively, are movable contacts 260, 262 and 264, having leads 266, 268 and 270, respectively. A movable contact 272 on resistance 116 is connected to a lead 274. Lead 276 is connected to resistance 126, and a lead 278 is connected to resistances 128 and 130. A lead 280 is connected to resistance 140.

Referring now to the upper left-hand portion of FIGURE 2, the clock or time switch 18 includes a clock motor 282 which has one terminal connected through a lead 284 to terminal 286 of transformer 98, and the other terminal connected through a lead 288 and a fuse 290 to terminal 292 of the transformer. Therefore, clock 282 runs continuously as long as power is available to the system. The operation of the time switch 18 is on a basic 24-hour cycle, so that when the gang switch 16 is set in the No. 3 or "Clock" position, the system maintains the desired "Day" temperature during the time when the space is to be occupied, and it maintains a lower "Night" temperature at all other times, that is, at night and over week-ends. Time switch 18 has four switches, as follows: "Heat-Up" switch 283 which is closed only during the heat-up period, "Day" switch 285 which is closed only during "Day" operation, "Night" switch 287 which is closed only during "Night" operation, and a "Heat-Up" and "Day" switch 289 which is closed during the heat-up period and "Day" period. A lead 291 connects switch 289 to switch 285.

The electric sequence timer 20 has a clock 294 which is connected at one side through lead 288 to the transformer, and at the other side through a lead 296 which is energized at all times that the system is in operation. Clock 294 sequentially closes the pairs of switches 298 and 304, 300 and 306, and 302 and 308, in accordance with a cycle of operation which, in this embodiment, is carried on each sixty seconds. At the beginning of the cycle, switches 298 and 304 are closed simultaneously, and at the end of twelve seconds this pair of switches is reopened; eight seconds later, switches 300 and 306 are closed, and they are reopened twelve seconds later; eight seconds later, switches 302 and 308 are closed, and they are reopened twelve seconds later; and eight seconds thereafter the cycle is started again. The closing of each pair of switches is substantially simultaneous, but the closing of one of a pair slightly before the other does not interfere with proper operation. However, the adjustments are such that each of the switches 298, 300 and 302 opens slightly before the opening of the other switch of its pair.

The manually operable gang switch 16 has eight decks which are identified by the respective suffixes 1 to 8, respectively, i.e., as 16–1, 16–2 . . . 16–8. Switch 16 has ten positions to which it may be turned by the knob 310 (see FIG. 1). The knob 310 is keyed to a shaft upon which are mounted the movable annular contact strips of the various decks. Knob 310 has a position indicator 311 which indicates the setting of the switch in one of its ten positions. These ten positions are identified from 1 to 10 as "Off," "Valve Setting," "Clock Control," "Night Control," "Day Control," "Temperature Indication," "Heat Indication," "Valve Position Indication," "Manual Valve Opening," and "Manual Valve Closing." Each of the decks has ten terminals corresponding respectively to the ten switch positions, and these terminals are identified by their respective numbers added as suffixes to the numbers of their respective decks. That is, in deck 16–1, the terminals are identified as 16–1–1, 16–1–2 . . . 16–1–10. The first terminals of each deck of the gang switch are represented in FIGURE 2 as positioned in a straight line, and the movable annular contact strip is represented by a straight strip, whereas the actual structure is annular, and is of a known type. In decks 16–1 to 16–7, there is a single movable contact which passes successively into contact with the fixed contacts, whereas in deck 16–8 all except 16–8–3 of the fixed contacts are engaged by the movable contact strip when the switch is in the "Off" position. As will be discussed more fully below, contact 16–8–3 is the only fixed contact to which a lead extends in deck 16–8. Hence, the two leads extending to deck 16–8 are not interconnected when the switch is in the "Off" position, but are interconnected in all other positions.

The connections from the various terminals of switch 16 will now be discussed. For deck 16–1, lead 244 is connected to terminals 2, 8, 9 and 10; lead 205 is connected to terminal 6; lead 208 is connected to terminal 4; lead 312 extends from terminal 3 to switches 287 and 289 of the time switch 18; and, lead 314 extends from terminal 5 to the switch 285 of the time switch 18 and thence to the right-hand side of each of switches 304, 306 and 308 of the timer 20. For deck 16–2, terminals 2, 8, 9 and 10 are connected to lead 252; terminals 3, 4 and 5 are connected to lead 278. For deck 16–3, terminals 2, 8, 9 and 10 are connected to lead 254, terminals 3 and 5 are connected to lead 276; and, terminal 7 is connected to lead 238. For deck 16–4, terminals 3 and 5 are connected to lead 280; and, terminal 7 is connected to lead 240. For deck 16–5, terminals 2, 8, 9 and 10 are connected to lead 132; terminals 3, 4 and 5 are connected to lead 266; terminal 6 is connected to lead 268; and, terminal 7 is connected to lead 270. For deck 16–6, terminals 2, 3, 4 and 5 are connected to a lead 316 having a removable shunt not shown; and, terminals 9 and 10 are connected respectively to leads 38 and 36. For deck 16–7, terminals 3, 4 and 5 are connected through a lead 318 to the right-hand terminal of switch 302. For deck 16–8, terminal 3 is connected to lead 296.

The movable contactors of switch 16 are identified by the suffix 11, and are connected as follows: Contactor 16–1–11 is connected to a lead 320; contactor 16–2–11 is connected to lead 40; contactor 16–3–11 is connected to lead 274; contactor 16–4–11 is connected through a lead 322 to a movable contact 324 on resistance 144. Contactor 16–5–11 is connected to a lead 326; contactor 16–6–11 is connected through a lead 328 to the high voltage terminal of the secondary 100 of the transformer; contactor 16–7–11 is connected to a lead 330; and, contactor 16–8–11 is connected to lead 284. Leads 320 and 326 are interconnected by a high resistance element 331.

The signal detector or amplifier 22 and the electronic timer 24 are connected to the remainder of the control system through an eight-terminal plug 332 and a four-terminal plug 334, the individual terminals of which are identified by suffix numerals, as indicated. Terminals 332–5 and 332–1 are connected respectively to leads 36 and 38 which extend from the valve motor 26 and are energized respectively to close and open the steam valve. Terminals 332–2, 332–3 and 332–4 are connected through leads 320, 326 and 316, respectively, to the gang switch 16. Terminal 334–1 is connected through a lead 336 to one side of each of the neon pilot or indicating lamps 338, 340 and 342, the other sides of which are connected by leads 337, 339 and 341, respectively, to switches 298, 300 and 302. These lamps are shown in FIGURE 1 on the control panel 13, and indicate "Minimum," "Normal" and "Maximum" control and indicating functions, as will be discussed below. Terminal 334–2 is connected to lead 330 which extends from the gang switch 16, and also to the electronic timer 24.

The signal detector or amplifier 22 includes two capacitors 344 and 346 and a pair of high resistances 348 and 350 which are connected through a lead 352 to terminal 332–4. A valve-closing relay 354 and a valve-opening relay 356 are energized, alternatively, to supply 24-volt alternating current from terminal 332–4 and a lead 358, and thence through either relay 354 and its lead 360 and terminal 332–5 to lead 36, or through relay 356 and its lead 362 and terminal 332–1 to lead 38. That is, when relay 354 is energized by supplying current to its solenoid 364, its contact is moved to close a normally open switch 366 so as to supply the current through lead 36 to operate motor 26 and impart closing movement to the valve. Similarly, the energization of the solenoid 368 of relay 356 moves its contact to close the normally opened switch 370 so as to supply current through lead 38 to motor 26 and impart opening movement to the valve.

Relay 354 has a signal lamp 372 which is positioned at the top of panel 13 (FIGURE 1), and which lights whenever the relay is energized, thus to indicate that the valve setting is "Above" that which is desired, or that a valve-closing step is in progress. A similar indicating lamp 374 is provided for the valve-opening relay 356 (FIGURE 2) and provides a corresponding indication with respect to the valve being "Below" the desired setting, or is receiving a valve-opening movement. These signal lamps are also used to indicate other characteristics and functions of the system, all as will be explained below. Lamps 372 and 374 receive current through the electronic timer 24. The lighting of lamp 372 is effected by the opening of a normally-closed, short-circuiting switch 376 in parallel with it, and in series with the lamp is a resistance 378. A similar short-circuiting switch 380 and a resistance 382 are provided for lamp 374. A trigger relay 384 has a solenoid 386 which is energized by the electronic timer 24 to close a pair of switches 388 and 390, and the closing of these switches initiates a valve-operating step or an indicating operation.

The circuit for the signal detector or amplifier 22 and the electronic timer is shown schematically in FIGURE 5. The valve-closing relay 354 and the valve-opening relay 356 are shown at the upper right of the figure, and their solenoids are connected to receive current through the thyratrons 392 and 394. During operation, a direct current voltage signal of either positive or negative voltage is received through the lead 352 and the high resistors 350 and 348 so as to charge the capacitors 344 and 346. When the trigger relay 384 closes switch 388, the capacitors discharge through a lead 396 to the three-stage amplifier 398. When the signal on capacitors 344 and 346 is negative, thyratron tube 392 is fired, so that current flows through solenoid 364 and relay 354 is closed. When the voltage signal on these capacitors is positive, the thyratron 394 is fired so that current flows through solenoid 368 and relay 356 is energized.

The energizing of the trigger relay is under the control of the electronic timer 24 which has a thyratron 400 and an amplifier circuit 402. The timing circuit is connected through a lead 401 to terminal 334–2, and this terminal is connected at this time through lead 330 (FIGURE 2), deck 16–7 of the gang switch, and lead 318 to one side of each of the switches 298, 300 and 302 of the timer switch 20. These timer switches are closed in a manner discussed above to light the respective signal lamps 338, 340 and 342 at the beginning of the respective signal detecting and control operations. The current flow through the respective signal lamp is therefore from the lead 401 and terminal 334–2, and this is sufficient to block the electronic timing operation. The opening of the switch 298, 300, or 302 breaks this circuit, and this starts the electronic timing cycle. Solenoid 386 is then energized so as to close switches 388 and 390, and these are held closed for a period of from two to three seconds.

The closing of switch 388 connects the capacitors 344 and 346 to the input side of the amplifier circuit 398, and the electric charge from these condensers acts as a transient charge which constitutes the signal which is amplified and impressed upon the thyratron tubes 392 and 394. If this signal is negative, then tube 392 is fired and relay 354 is closed for a predetermined period of two to three seconds. If the signal is positive, then tube 394 is fired and relay 356 closed for the same period. It has been indicated above that each of the switches 304, 306 and 308 remains closed until the other switch of its pair has been opened, and that the opening of that other switch starts the timing operation. This insures that capacitors 344 and 346 will be charged to the full voltage of the signal at the time that the signal is transmitted to the amplifier circuit. However, the high resistances 348 and 350 prevent the flow of signal current to have any appreciable effect after the capacitors have been connected to the amplifier circuit.

As will be explained more fully below, the "Minimum," "Normal" and "Maximum" signals are transmitted to the timer 20 from the bridge circuits through leads 214, 172 and 210, respectively. Hence, upon the closing of one of the switches 304, 306 or 308, the signal is transmitted through lead 314 to contact 16–1–5 of the gang switch, or through the clock timer switch 285, lead 291, switch 289 and lead 312 to contact 16–1–3. Hence, when the gang switch is in either the "Clock" position No. 3, or "Day" position No. 5, the signal is transmitted through lead 320 to terminal 332–2 and lead 352 to the capacitors 344 and 346.

The present system permits the operator to obtain indications of the temperature and other conditions within the system. To obtain such indications, the operator presses a push button 406 (FIGURE 1) near the top of the panel, and this is also represented at the lower left-hand portions of FIGURES 2 and 5. As shown in FIGURE 5, the pushing of this push button 406 opens a pair of switches 408 and 410, and closes a switch 412. This removes a substantial portion of the capacitance from the electronic timer circuit so that the timing period is materially reduced. Therefore, during the indicating operations, the relays 354 and 356 are closed and opened rapidly, and the operator does not need to wait for the more extended timing cycles which are carried on by the electronic timer in connection with the signaling-sensing and valve-moving operations.

The manner of operation to produce the "Minimum," "Normal" and "Maximum" signals will now be discussed. In FIGURE 4 the bridge circuits are represented with the elements and components being arranged for convenience of explanation and understanding. Attention is particularly directed to the bridge circuits and the signals during "Day" operation, but FIGURE 4 is also used in explaining the functioning when the gang switch is set in the other positions. Resistance 32 of the steam valve potentiometer 28 is connected through leads 42 and 44 in series with resistances 164 and 166.

The "Room Temperature" control bridge, generally indicated at 410, exerts control for "Day" operation and is formed as follows: two legs are formed by the room thermostat resistor or resistance element 46 and resistance 162, together with the leads extending to the room thermostat and shunt 52, and a central "Room" temperature control potentiometer formed by resistance 154 and its contact 158; and the other two legs are formed by resistances 146, 148, 150 and 152. Contact 158 is connected through lead 160 to the juncture of resistances 148 and 150, and these resistances, with their contacts 224 and 226, respectively, form "Maximum" and "Minimum" control potentiometers. Contact 224 is connected through resistance 202 to the "Maximum" signal lead 210, and contact 226 is similarly connected through resistance 207 to the "Minimum" signal lead 214. There is a "Night" temperature-control potentiometer formed by resistance 156 and its contact 222. Contact 222 is the source for the basic "Night" temperature control signal, and this contact is adjusted to change the "Night" temperature setting.

The "Normal" signal bridge 412 is formed by: two legs are formed by the hot air temperature resistance 74, the "Heat Balance" centering-adjustment potentiometer formed by resistance 144 and contact 324 and the cold air temperature resistance 72, together with the leads extending to these resistances; the other two legs of the bridge are formed by the "Window" thermostat resistance 58, resistance 138, the potentiometer formed by resistance 136 and its contact 142, shunt 60 and the leads extending to the "Window" thermostat; and, the "Normal" temperature ratio adjustment potentiometer, formed by resistance 140 and contact 186, which is connected across the bridge for "Day" operation. Contact 186 is connected through a lead 184 and resistance 182 to the "Normal" signal lead 172.

The resistance network also forms a connecting bridge 414 as follows: two legs formed by resistances 120, 122 and 124, with contact 134 forming a potentiometer with resistance 122; the other two legs formed by resistances 114, 116 and 118, with contact 272 forming a potentiometer with resistance 116; resistances 126, 128 and 130 connected at one side through lead 132 to contact 134 and with resistance 126 being connected at the other side through leads 276, deck 16–3 of the gang switch and lead 274 to contact 272; and, resistances 128 and 130 are connected by a lead 278, deck 16–2 of the gang switch and lead 40 to contact 30 of the valve potentiometer 28; contact 176 is connected through lead 174 and high resistance 168 to the "Normal" signal lead 172, and contact 180 is connected through a lead 178 and high resistance 170 to lead 172. Contact 198 is connected by lead 196 through high resistance 194 to the "Minimum" signal lead 214, and also through high resistance 190 to the "Maximum" signal lead 210.

With this arrangement, the "Normal," "Minimum" and "Maximum" signals are taken from their respective leads 172, 214 and 210, and each is independent of the condition of balance or unbalance of the other two. The conditions of balance of the "Day" temperature bridge and the "Normal" signal bridge are both affected by changes in the setting of the steam valve potentiometer 28. However, with the interconnecting resistance network circuit herein disclosed, a change in a resistance value or a change in the condition of balance of either the "Day" temperature bridge or the "Normal" signal bridge does not have any material effect upon the other. With this arrangement, all of the resistances are energized constantly whenever the control system is in use. Furthermore, no switches are required to connect or disconnect the bridge circuits or components thereof to the resistance network. Hence, the "Normal," "Minimum" and "Maximum" signals are available at all times for the purpose of controlling the temperature or to indicate to the operator the conditions within the circuit.

With the system herein disclosed, the "Normal" signal is derived from the heat balancer unit 12 and the window thermostat 10, while the "Maximum" and "Minimum" signals are derived from the room thermostat 8. During each complete control cycle, the "Minimum" signal is impressed upon the signal detector and amplifier 22, and a corresponding change in the valve setting is made. Assuming that the room temperature is within acceptable limits, then the "Minimum" signals will be "Above," and the "Above" or valve-closing relay is energized and the valve is closed one step. The "Normal" signal is then taken, and the valve will be opened or closed one step, or it will remain unchanged, depending upon whether the heat being supplied to the space 2 as indicated by the "heat balancer" unit 12, is below or above, or equal to, the heat required for the temperature of the window thermostat 10. Thereafter, the "Maximum" signal is impressed upon the signal detector and amplifier 22; if the space temperature is within the acceptable limits, the "Below," or valve-opening relay 356 is energized, so that the valve is opened one step. Hence, at all times when the space temperature is within the acceptable limits, the "Minimum" signal always causes a valve-closing step, and the "Maximum" signal always causes a valve-opening step, and these two steps cancel out each other so that the only valve change is any which results from the "Normal" signal.

However, if the room thermostat should sense a temperature below the lower limit of the acceptable range, then the "Minimum" signal will energize the "Below" or valve-opening relay, and the "Maximum" signal will do the same, so that the "Minimum" and "Maximum" signals both produce valve-opening movements, and the valve is given a double opening, or "Open" step. If the heat being supplied is above that required in accordance with the temperature of the window thermostat, then the "Normal" signal will cause a valve-closing step, so that the net change in the valve during that cycle is that the valve has been opened one step. However, if the heat being supplied is below that required by the temperature of the window thermostat, then the "Normal" signal will also open the valve one step so that the valve is given three opening steps during that complete cycle.

Assuming that the space temperature is above the acceptable range, then the "Minimum" and "Maximum" signals will both energize the "Above" or valve-closing relay, so that they impart a double-closing step to the valve. However, here again, if the "Normal" signal is "Below," then the complete control cycle will include the valve-opening step of the "Normal" signal. But if the "Normal" signal is also above, then all three steps in the cycle will be valve-closing steps.

It is thus seen that a rapid change in the outside temperature, accompanied by a corresponding change in the space or room temperature will cause an appropriate rapid opening or closing of the valve to provide the required heating. However, a slow change in the outside temperature will cause a correspondingly slow change in the rate of movement of the valve as long as the room or space temperature is within the acceptable limits. At any time that the room or space temperature goes above or below the acceptable limits, then there is a rapid change of the valve setting, irrespective of the outside temperature. However, if the change in the room or space thermostat temperature is only the result of the temporary opening of a door or window, or if there is some other temporary factor which causes the space temperature to drop for only a short period of time, then the resulting change in the valve position will be cancelled out by a reverse action during the next few control cycles.

It has been explained above that the "Minimum" signal is impressed upon lead 210, and that at the beginning of a control cycle switches 298 and 304 are closed simultaneously. The closing of switch 298 lights signal lamp 338, and it also incapacitates the electronic timer 24. The closing of switch 304 causes the "Minimum" signal to be transmitted by lead 314, deck 16–1 of the gang switch, lead 320, terminal 333–2 and lead 352 to the capacitors 344 and 346, and these capacitors are charged to the positive or negative potential of the "Minimum" signal. Switch 298 then reopens, extinguishing lamp 338 and starting the electronic timer, so that the trigger relay is energized and the charge of the capacitors 344 and 346 is transmitted as the control signal to the signal detector or amplifier 22. However, switch 304 has then been opened, and signal current no longer can flow to the capacitors, so that the signal is a voltage or potential signal.

If the signal is negative, then relay 354 is energized, so that the valve is given a closing step which is illustratively of the order of two to three seconds. If the signal from the capacitors is positive, then the valve is opened a similar amount. But, if the room temperature is at substantially the acceptable upper limit, neither relay will be energized and the valve remains stationary. Shortly thereafter, switches 300 and 306 are closed, so as to transmit the "Normal" signal to the capacitors 344 and 346, and then to the signal detector or amplifier which responds to this signal to impart any appropriate movement to the valve. Switches 302 and 308 are then closed, and the "Maximum" signal is transmitted to the capacitors, and then to the signal detector or amplifier, which again responds to produce any appropriate valve movement. During the cycle of the control operation, as just described, an operator may stand before the panel and can determine the general condition of the system by observing the lamps. That is, he will see the "Minimum" lamp 338 light, and this will indicate that a "Minimum" temperature sensing and control operation is starting. He can then observe whether the "Above" lamp 372 or "Below" lamp 374 is lighted. As the operation proceeds, he can watch the "Normal" lamp indication and then the "Maximum" lamp indication, each followed by the "Above" or "Below" indication.

It has been assumed in most of the above discussion that the gang switch 16 is set in "Day" or No. 5 position. It has been noted that identical results are obtained during "Day" operation when the gang switch 16 is set for "Clock" control at the No. 3 position, contacts 16–1–3 and 16–1–5 being connected through the time switch 18 during the "Day" operation by the time switch.

When gang switch 16 is set for "Night" operation at postion No. 3, the "Day" temperature signals are not transmitted to the signal detector or amplifier 22, because the "Maximum" and "Minimum" signal leads are disconnected. However, the "Night" temperature signal at lead 216 is connected through resistor 200 to lead 208, and this lead is connected through high resistance 188 and lead 196 to the interconnecting bridge 414. Hence, the "Night" bridge is interconnected with the valve motor rheostat. The "Night" temperature control signal is transmitted by lead 208 to terminal 16–1–4 of the gang switch 16, and also to the "Night" switch 287 of the time switch 18. This "Night" control signal is therefore transmitted to the capacitors 344 and 346, and then to the relays 354 and 356 in the same manner in which the "Minimum," "Normal" and "Maximum" signals are transmitted from lead 314. The "Night" signal is therefore available, and maintains the temperature within the present acceptable range. Accordingly, when the gang switch is set for "Clock" operation, the "Night" control signals pass through the time switch, and are utilized during the "Night" operation.

It has been indicated above that the pressing of the indicator button 406 gives a rapid indication of the functioning and characteristics of the system. Assuming that the gang switch is set at one of the positions 3, 4 or 5, i.e. clock control, night control or day control, then the pressing of the indicator switch causes the electronic timer 24 to carry on a rapid cyclic operation, for example, of one or two seconds duration. During each cycle, there is an indication by the "Above" and "Below" signal lamps, and also whether the control signals are from the "Minimum," "Normal" and "Maximum" bridge circuits. In other words, the operator may determine immediately whether the steam valve is being opened, closed, or left unchanged for each of the control signals.

If the gang switch is turned to position 6, Temperature Indication, and the Indicator button is then pressed, the "Above" and "Below" lamps indicate whether the room temperature is above or below the setting of the room temperature dial 416. The operator can then determine the exact room temperature by turning this dial until neither the "Above" nor the "Below" lamps is lighted. A similar reading is taken of the heat being added to the space in terms of the percentage of the total heat which is available. This reading is obtained by turning the gang switch to "Heat Indication" and then pressing button 406 and turning the heat or valve indicator dial 418 until neither the "Above" nor the "Below" lamp is lighted. The same dial 418 is also used to take a reading of the percentage of opening of the valve. This is accomplished by turning the gang switch to the valve indicator position, and then pressing button 406 while adjusting dial 418 until both the "Above" and "Below" lamps are extinguished.

The valve may be opened manually by turning the master switch to the No. 9 or the "Manual Valve Opening" position. The valve motor then operates continuously to open the valve. The valve is closed in a similar way by turning the gang switch to the No. 10 or "Manual Valve Closing" position. While the valve is being thus manually controlled a reading of the percentage of opening can be obtained by pressing the Indicator button 406 and adjusting dial 418 until neither the "Above" nor the "Below" lamp lights. The valve may also be moved gradually, step-by-step, toward any selected percentage of opening by turning the gang switch to position No. 2, "Valve Setting" and setting dial 418 to the desired percentage of opening.

The system herein disclosed provides for imposing a change upon the control effect of the heat balancer unit 12. The dial 418 has a second scale 420 with a zero at the top, and with graduations 1–5 clockwise and counterclockwise therefrom. When it is desirable to provide relatively more or less heat for a particular outside temperature condition, the dial is turned to the right or left to the appropriate number from 1 to 5. The system continues to operate as outlined above, but the turning of this dial raises or lowers the normal heat balance rate or ratio. In this way, the operator may provide a temporary change in the "Normal" temperature, and may then return to the original setting by turning the dial back to the "0" position.

It has been pointed out above that the effective control signals are potential signals, as distinguished from current signals. This result is accomplished by providing high resistances which prevent appreciable current flow during the periods when control signals are being transmitted. The resistance network, including the bridges, is maintained in a condition of stability with respect to the distribution of the various potentials. Hence, each bridge has available the appropriate potential with respect to its condition of balance or unbalance, and the high resistances between the bridges prevent the condition of balance or unbalance in one bridge from producing a material effect upon the signal from the other bridge.

This system includes an arrangement for rapid "heat-up" under the automatic control of the time switch. As shown in FIGURE 4, the basic signal is taken from line 160, and the circuit extends through resistor 206 to lead 212 which is connected through a high resistance 192 and lead 196 to contact 198 of the interconnecting bridge 414. The heat-up signal is passed from lead 212 (FIGURE 2) through switch 283 of the clock switch 18, and through lead 291 and switch 289 to lead 312, and thence through deck 16–1 of the gang switch to the signal detector or amplifier 22. The clock switch 18 automatically initiates and discontinues the heat-up operation and, during this time heat is supplied to the space at a high rate. It has been indicated above that the basic "Night" control temperature is taken from contact 222 on lead 216, and this lead is connected through a resistor 200 to a lead 208 which extends to the gang switch 16 and to the time switch 18, as outlined above. Lead 208 is also connected through resistance 188 and lead 196 to contactor 198 of the interconnecting bridge.

It has been pointed out above that contactor 158 may be adjusted along its resistance 154 to change the effective setting of the room thermostat and "Day" operation, and contactor 222 may be adjusted to change the effective setting for "Night" operation. The "Maximum" and "Minimum" settings may also be changed by changing the settings of the contactors 224 and 226, respectively. Similar adjustments may be made in bridge 412 by moving contactors 324 and 142. Provision is also made in the resistance network 14 for further adjusting and balancing the system.

As indicated above, resistances 188, 190, 192, 194, 168 and 170 are high resistances, and in the illustrative embodiment of the invention, each of these resistances has a value of 8200 ohms, whereas each of the connecting resistances 200, 202, 206, 207, and 182 has a value of 820 ohms, and the resistance values of the resistances forming four legs of each of the bridge circuits is relatively small, of the order of 100 to 1,000 ohms. The interconnecting resistors 126, 128 and 130 have a value of 5,000 ohms.

The detailed circuit of FIGURES 2 and 3 shows means for adjusting the various characteristics and operating limits of the system. It has been indicated that the specific time factors which have been indicated are illustrative, and the timing arrangements provide for wide variations in the timed operations. Under some circumstances, it is desirable to open and close the steam valve at a more rapid rate than discussed above, in which case each valve-moving step is increased by extending the time of the energized periods of relays 354 and 356.

In the illustrative embodiment of the present invention, it is contemplated that steam is available at valve 7 at a pressure of the order of two to ten pounds, but many aspects of the invention are applicable to other heating systems, and for accomplishing other control functions. It has also been indicated above that the present invention relates to the invention of the prior Patent No. 2,362,977 of David N. Crosthwait and myself. Many features of the illustrative embodiment of the present invention are similar to the corresponding features of the system disclosed in that patent.

It should be noted that elements or components of the system, as represented in FIGURE 1 of the drawings, may be located remote from each other and, in fact, each component is located at the most convenient position consistent with accomplishing its functions. Extended steam lines between the control valve and the temperature-sensing units provide advantages for some conditions of operation.

The present system is adaptable to many conditions which are encountered in practice, and the system may be installed and adjusted with minimum difficulty and expense. During operation, the system requires minimum service because of the small number of relays, switches and other components which might cause difficulties.

It has been pointed out above that motor 26 opens and closes the valve by step movements and the contact 30 of the potentiometer 28 is moved with each movement of the valve. The potentiometer 28 is interconnected by high-impedance coupling circuits with the low-impedance bridge arms to form compound bridge circuits as described above. Each change in the valve opening is in response to a condition of unbalance of one of the control bridge circuits, and the resulting effect of the change in the potentiometer setting tends to rebalance the bridge circuit. The high impedance detector is connected to an intermediate point in the coupling bridge circuits, and responds to a combination of the electrical potentials at the output points of the individual bridge branches. The high impedance of the coupling circuits prevents the output potential of any one bridge branch from being affected significantly by current flow to it from other bridge branches. In this way, the bridge branches are permanently interconnected into the compound bridge circuits. The position of the contact arm of the potentiometer is varied, with changes in the valve opening which is the set rate of the heat supply. As a result of the change in the valve opening, there is a change in the amount of steam delivered to the heat balancer and, after a time lag, there is a corresponding change in the rate at which heat is being added or delivered to the space.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In a balanced bridge-type control system for controlling the temperature within a space, a first bridge comprising a plurality of resistances including a temperature-responsive resistance, said first bridge having a pair of energizing terminals, a pair of signal leads connected to different points of said first bridge to provide respective signals indicating whether the temperature is above or below maximum and minimum limits defining an acceptable range of temperature within the space, a second bridge comprising a plurality of resistances including resistances the values of which vary in response to changes in the basic demand for heating and to changes in the rate at which heat is being delivered to the space, said second bridge having a pair of energizing terminals, the respective energizing terminals of said first and second bridges being interconnected, a signal lead connected to said sectiond bridge to provide a signal responsive to changes in the resistances thereof, heat supply means including means for altering the rate at which heat is delivered to the space, potentiometer circuit means having a shiftable contact positionable by said heat supply means in accordance with the rate at which heat is being supplied, the potential of said contact thereby being varied with changes in the set rate of the heat supply for the space, a connecting resistance circuit connecting said signal leads to said potentiometer means contact, said resistance circuit being formed by a plurality of high resistances which are of such high value as to prevent interaction between the bridges, bridge energizing means for continuously furnishing electrical current to the interconnected energizing terminals of said first and second bridges, and sensing and controlling means to sense the potentials of said signal leads and to control said heat supply means in accordance with the signals on said leads so as to maintain the desired temperature in said space.

2. A control system as described in claim 1, including means to sequentially connect said signal leads to said sensing and controlling means, said sensing and controlling means including means responsive to the signals on said pair of leads of said first bridge to increase the rate of heat supply a predetermined amount if the signal indicates that the temperature is below the corresponding one of said limits, and to decrease the rate of heat supply said predetermined amount if the signal indicates that the temperature is above the corresponding one of said limits, the changes in heat supply thereby cancelling each other out when the space temperature is between said maximum and minimum limits.

3. A control system as described in claim 2, wherein said sensing and controlling means includes means responsive to the signal on said lead from said second bridge and operable to increase or decrease the rate of heat supply said predetermined amount when the signal on that lead is below or above a particular value.

4. A control system as described in claim 1, wherein said connecting resistance circuit comprises a third bridge having a pair of energizing terminals interconnected with the energizing terminals of said first and second bridges.

5. In a control system of the character described, a resistance network forming a plurality of temperature sensing bridges having energizing terminals and output terminals, an interconnecting bridge having energizing terminals and at least one output terminal, said interconnecting bridge including in one arm thereof potentiometer means which is adjusted in accordance with the set rate of heat supply, means interconnecting the energizing terminals of all of said bridges for continuous energization thereof, high impedance means connecting the output terminal of said interconnecting bridge with the output terminal of at least one of said temperature sensing bridges, capacitor means, a sequence mechanism which operates to connect in sequence an output terminal of each of said sensing bridges with said capacitor means, thereby to charge said capacitor means to a potential corresponding to the condition of balance or unbalance of each particular bridge, and potential responsive means connectible to said capacitor means to effect a change in the rate at which heat is being supplied in accordance with each potential signal which is received.

6. A control system as described in claim 5, including switch means operable to establish connection intermittently between said capacitor means and said potential responsive means, said switch means being synchronized with said sequence mechanism and arranged to establish said connection a short time after said capacitor means has been connected to one of said signal leads.

7. A control system as described in claim 6, wherein said sequence mechanism operates to disconnect said capacitor means from said signal leads while said connection is established between said capacitor means and said potential responsive means.

8. A control system as described in claim 5, including resistance means connected in series between said capacitor means and said signal leads to minimize the current flow to said capacitor means.

9. In a control system of the character described for controlling the supplying of heat to a space in accordance with the demand as indicated by the temperature within the space and also in accordance with whether or not heat is actually being received by the air within the space at a rate equal to the basic demand, a resistance network forming a plurality of low impedance bridges having energizing and output terminals, means interconnecting said energizing terminals to provide continuous energization of said bridges, said bridges including temperature-sensitive resistance elements arranged to produce on said output terminals signals indicating whether or not the temperature within said space is within maximum and minimum limits and whether or not heat is being received at a rate equal to the basic demand, high impedance coupling circuits interconnecting the output terminals of said low impedance bridges and forming compound bridge circuits, a high impedance detector connectible to said bridge output terminals to receive the signals theron, and heating supply means under the control of said detector and operable thereby to alter the set rate of heat supply in accordance with the magnitudes of said signals.

10. In a system for controlling the temperature of a space, heat supply means for furnishing heat to the space and including adjustment means to alter the set rate at which heat is furnished, temperature sensing means including electrically-operable means for producing a pair of temperature signals indicating respectively whether the space temperature is above or below a predetermined minimum limit and whether the temperature is above or below a predetermined maximum limit, control means to receive said signals and to actuate said heat supply means in accordance therewith, cyclic means for feeding said signals to said control means in sequence, and operating means forming part of said control means to increase the set rate of heat supply a predetermined amount if a received signal indicates the temperature is below the limit corresponding to that signal and to decrease the set rate of heat supply said predetermined amount if a received signal indicates the temperature is above the limit corresponding to that signal.

11. A system as claimed in claim 10, wherein said electrically-operable means includes at least one resistance bridge having energizing terminals and output terminals on which said temperature signals appear, a potentiometer circuit under the control of said heat supply means to produce a signal indicative of the set rate of heat supply, energizing means connected to said bridge energizing terminals and said potentiometer circuit to provide continuous energization thereto, and high-impedance coupling means connecting said potentiometer signal to said bridge output terminals.

12. A system as claimed in claim 10, wherein said operating means includes a pair of relays selectively operable in accordance with whether a received signal is above or below the limit corresponding to that signal, and motor drive means forming part of said heat supply means and controllable by said relays to adjust the set rate at which heat is being supplied.

13. A system as claimed in claim 10, wherein said control means includes capacitance means arranged to be charged to a potential corresponding to the temperature signal applied thereto, amplifier means, switch means under the control of said cyclic means and operable to connect said capacitance means to the input of said amplifier means after the capacitance means has been charged, said operating means being actuated in response to the output of said amplifier means.

14. A system as claimed in claim 13, wherein the temperature signals produced by said electrically-operable means are D.-C. electrical potentials having polarities in accordance with whether the temperature is above or below the limit corresponding to the signal, said amplifier means including means to produce alternative outputs in accordance with the polarity of the input thereto, motor drive means under the control of said amplifier output to adjust the set rate of heat supply at a constant speed and in a direction according to which of said alternative amplifier means outputs is developed, and timer means synchronized with said switch means to activate said motor drive for a predetermined period of time after the capacitance means is coupled to the input of said amplifier means.

15. In a balanced bridge-type control system for controlling the temperature within a space, a first bridge comprising a plurality of resistances including a temperature-responsive resistance, said first bridge having a pair of energizing terminals, signal lead means connected to said first bridge to provide signals indicating whether the temperature is above or below maximum and minimum limits defining an acceptable range of temperature within the space, a second bridge comprising a plurality of resistances including a resistance the value of which varies in response to changes in the basic demand for heating, said second bridge having a pair of energizing terminals, the respective energizing terminals of said first and second bridges being interconnected, signal lead means connected to said second bridge to provide a signal responsive to changes in the balance thereof, heat supply means including means for altering the rate at which heat is delivered to the space, circuit means under the control of said heat supply means to produce a set signal in accordance with the set rate at which heat is being supplied, a connecting resistance circuit connecting said set signal to said signal lead means, said resistance circuit being formed by a plurality of high resistances which are of such high value as to prevent interaction between the bridges, bridge energizing means for continuously furnishing electrical current to the interconnected energizing terminals of said first and second bridges, and sensing and controlling means to sense the potentials of said signal lead means and to control said heat supply means to alter the set rate of heat supply in accordance with the signals on said leads so as to tend to maintain a desired temperature in said space.

16. The system as described in claim 5 wherein said potential responsive means includes a pair of relays one of which is operated by a negative potential and the other of which is operated by a positive potential, an amplifier circuit for the potential signals, and timer means to control the periods which said relays are maintained energized.

17. The system as described in claim 16 wherein one of said temperature sensing bridges includes a room thermostat and another of said temperature sensing bridges includes two legs including resistances which are responsive respectively to the temperatures of a stream of air before and after it has been heated and a third leg which is responsive to the outside temperature, said circuit including "Maximum" and "Minimum" signal leads connected to the first-mentioned temperature sensing bridge and a "Normal" signal lead connected to said other temperature sensing bridge, said output terminal of said interconnecting bridge being connected to each of said "Maximum," "Minimum" and "Normal" signal leads by high resistances.

18. A system as described in claim 17 wherein said interconnecting bridge includes three high resistance potentiometers which have contacts to which said signal leads are connected.

19. In the art herein described of controlling the supplying of heat to a space, the steps of, providing three potential signals, the first of said signals indicating whether the temperature is above or below a minimum value, the second of said signals indicating whether the temperature is above or below a maximum value, and the third of said signals indicating whether the amount of heat being supplied to the space corresponds to that required for the ambient conditions, imposing said potential signals in sequence upon capacitance to produce charges corresponding respectively to said three potential signals, and connecting said potential signals from said capacitance sequentially to potential responsive means for producing equal and opposite control effects during each complete cycle of the control operation whenever the space temperature is within acceptable limits and reversing the direction of the appropriate step when the temperature is outside of said limits.

20. The art as described in claim 19 which includes producing a third control effect in one direction or the other depending upon whether the heat supplied is above or below that required by the ambient conditions.

References Cited in the file of this patent

UNITED STATES PATENTS

| 2,803,268 | Davis | Aug. 27, 1957 |
| 2,815,480 | Ruge | Dec. 3, 1957 |

FOREIGN PATENTS

| 527,349 | Great Britain | Oct. 7, 1940 |